(12) United States Patent
Hakala et al.

(10) Patent No.: US 7,840,586 B2
(45) Date of Patent: Nov. 23, 2010

(54) SEARCHING AND NAMING ITEMS BASED ON METADATA

(75) Inventors: Tero Hakala, Kangasala (FI); Juha Lehikoinen, Lakiala (FI)

(73) Assignee: Nokia Corporation, Espoo (FI)

( * ) Notice: Subject to any disclaimer, the term of this patent is extended or adjusted under 35 U.S.C. 154(b) by 1275 days.

(21) Appl. No.: 10/879,534

(22) Filed: Jun. 30, 2004

(65) Prior Publication Data

US 2006/0004712 A1 Jan. 5, 2006

(51) Int. Cl.
*G06F 7/00* (2006.01)
*G06F 17/30* (2006.01)

(52) U.S. Cl. .................... 707/765; 707/759

(58) Field of Classification Search .............. 707/3, 707/1, 759, 765
See application file for complete search history.

(56) References Cited

U.S. PATENT DOCUMENTS

| | | | | |
|---|---|---|---|---|
| 5,544,061 A | * | 8/1996 | Morimoto et al. | 701/202 |
| 5,802,361 A | | 9/1998 | Wang et al. | |
| 5,915,251 A | | 6/1999 | Burrows et al. | |
| 6,009,442 A | * | 12/1999 | Chen et al. | 715/522 |
| 6,665,841 B1 | | 12/2003 | Mahoney et al. | |
| 2001/0016849 A1 | | 8/2001 | Squibbs | |
| 2002/0055943 A1 | * | 5/2002 | Kusama | 707/201 |
| 2003/0061209 A1 | * | 3/2003 | Raboczi et al. | 707/3 |
| 2003/0187844 A1 | | 10/2003 | Li et al. | |
| 2004/0098362 A1 | | 5/2004 | Gargi | |

FOREIGN PATENT DOCUMENTS

| | | | |
|---|---|---|---|
| EP | 1566743 A1 | 8/2005 | |
| JP | 08-006964 | 1/1996 | |
| JP | 2002202975 | 7/2002 | |
| JP | 2003271652 | 9/2003 | |
| WO | 2004/006128 | 1/2004 | |
| WO | WO 2005/024681 A1 | 3/2005 | |

OTHER PUBLICATIONS

International Search Report of PCT/IB2005/002165 dated Jun. 17, 2005.
Text of the First Office Actrion for Chinese Application No. 2005800260046 dated Jan. 25, 2008.
Office Action in Russian Patent Application No. 2007100499/09(039174), dated Dec. 11, 2009, with English translation.
Office Action in Chinese Patent Application No. 200810099669.5, dated Jan. 8, 2010, with English translation.

(Continued)

*Primary Examiner*—John R. Cottingham
*Assistant Examiner*—Mariela D Reyes
(74) *Attorney, Agent, or Firm*—Banner & Witcoff, Ltd (57) ABSTRACT

A user interface may be provided that allows a user to select one or more stored items and display metadata attributes for those items. The user may further specify modifiers for one or more of the metadata attributes and perform searches based on selected ones of the metadata attributes and/or selected ones of the modifiers. In addition, a descriptive phrase may be automatically generated for one or more items. The descriptive phrase may be generated based on one or more of the metadata attributes. In doing so, metadata attributes may be converted to more user-friendly forms and collected into a sentence or other phrase. The descriptive phrase may be attached to the one or more items.

31 Claims, 4 Drawing Sheets

OTHER PUBLICATIONS

Word 2000 Chinese Version Quick Study Manual, Weiwen Working Room, pp. 80-84, Posts & Telecom Press.
English Language—Text of the Second Office Action for Chinese Application No. 2005800260046 Jul. 11, 2008.
Notice of Reasons for Rejection for JP2007-518738, mailed Oct. 13, 2009, with English Translation.
Office Action in JP patent application No. 2007-518738, dated Apr. 20, 2010 (with English translation).

* cited by examiner

SEARCHING AND NAMING ITEMS BASED ON METADATA

FIELD OF THE INVENTION

Aspects of the present invention are generally directed to methods, apparatuses, and user interfaces for generating descriptive phrases from one or more metadata attributes, as well as for searching for items based on metadata.

BACKGROUND

Mobile terminals, such as cellular telephones, now have more memory than ever, with memory resources expected to approach gigabyte levels in the near future. One reason for this is that mobile terminals are now able to generate and process various types of information such as audio, image, and/or video media files. Many cellular telephones and personal digital assistants, for example, now include a digital still camera and/or video camera. It is not uncommon for all available memory to be used by storing such media files. Since the resolution and quality of these cameras increase with each new generation of devices, more and more memory is needed. Memory requirements are expected to increase even more rapidly as users begin sharing media files between such devices.

As the amount of stored content grows, so does the need to search through such content. While search engines currently exist to search for files, such as by date, time, or title, conventional search engines are becoming obsolete. This is especially true when using a mobile terminal, which typically has relatively limited input capabilities (e.g., a dozen or so buttons). There is a need for search capabilities in devices such as mobile terminals to provide as much assistance as possible to the user to organize, search, and use stored content.

SUMMARY OF THE INVENTION

Aspects of the present invention are directed to using metadata attributes to search through stored items such as media files. A user interface may be provided that allows a user to select one or more items and display metadata attributes for those items. The user may further specify modifiers for one or more of the metadata attributes and perform searches based on selected ones of the metadata attributes and/or selected ones of the modifiers. The user interface may be designed to be based mainly on visual interaction and may require either no or a minimal amount of typing by the user. This may be useful when the user interface is implemented on a mobile device or other device where the user input interface is limited (e.g., due to a reduced or ambiguous keyboard such as a telephone keypad).

Further aspects of the present invention are directed to automatically generating a descriptive phrase for one or more items. The descriptive phrase may be generated based on one or more of the metadata attributes. In doing so, metadata attributes may be converted to more user-friendly forms and collected into a sentence or other phrase. The descriptive phrase may be attached to the one or more items, either as a title for each item or as another metadata attribute.

These and other features of the invention will be apparent upon consideration of the following detailed description of illustrative embodiments.

BRIEF DESCRIPTION OF THE DRAWINGS

The foregoing summary of the invention, as well as the following detailed description of illustrative embodiments, is better understood when read in conjunction with the accompanying drawings, which are included by way of example, and not by way of limitation with regard to the claimed invention.

DETAILED DESCRIPTION OF ILLUSTRATIVE EMBODIMENTS

Figure 1:
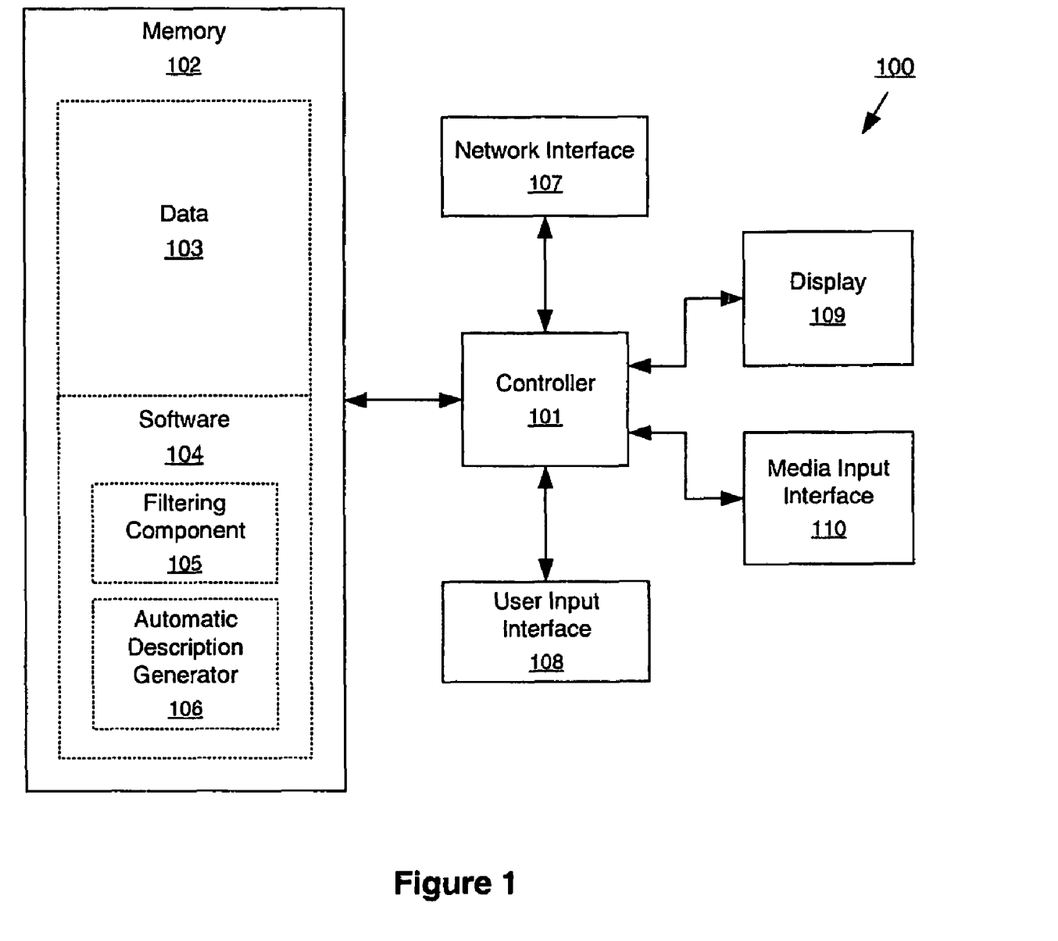
FIG. 1 is a functional block diagram of an illustrative electronic device that may be used in accordance with at least one aspect of the present invention.

FIG. 1 is a functional block diagram of an illustrative computer 100. The computer 100 may be, or be part of, any type of electronic device, such as a personal computer, personal digital assistant (PDA), cellular telephone, digital camera, digital camcorder, digital audio player, television, set-top box, personal video recorder, watch, and/or any combination or subcombination of these, such as a camera/phone/PDA. The electronic device may be a mobile device, which is a device that can wirelessly communicate with base stations and/or other mobile devices. The computer 100 of the electronic device may include a controller 101 that controls the operation of the computer 100. The controller 101 may be any type of controller such as a microprocessor or central processing unit (CPU). The controller 101 may be responsible for manipulating and processing data, for executing software programs, and/or for controlling input and output operations from and to the electronic device. The controller 101 may be coupled with memory 102, a network interface 107, a user input interface 108, a display 109, and/or a media input interface 110.

The network interface 107 may allow for data and/or other information to be received into, and/or to be sent out of, the electronic device. For example, data files may be sent from one electronic device to another. Where the electronic device is a mobile device, the network interface 107 may be a wireless interface, such as a radio frequency and/or infra-red interface. Where the electronic device is a non-mobile device, the network interface 107, if one exists, may be a wired interface such as an Ethernet or universal serial bus (USB) interface. In a mobile device, the network interface 107 might include only a wireless interface or both a wireless interface and a wired interface.

The user input interface 108 may be any type of input interface, such as one or more buttons (e.g., in the form of a keyboard or telephone keypad), one or more switches, a touch-sensitive pad (which may be transparently integrated into the display 109), one or more rotatable dials, and/or a microphone for voice recognition.

The display 109 may be any type of display, including but not limited to a liquid crystal display (LCD), a light-emitting diode (LED) display, an organic-LED (OLED) display, a plasma display, and/or an LCD projector. The display 109 may be physically divided into one or more displayable portions, and may include one or more display screens and/or one or more individual indicators such as status lights.

The media input interface 110 may provide media data (i.e., audio, video, and/or still images) to the computer 100. The media input interface 110 may include or be coupled to media input devices, e.g., a microphone, a still image camera, and/or a video camera. The processor 101 may store such media data in one or more media files in the memory 102. The processor 101 may further cause media data to be displayed on the display 109, be output to a speaker, and/or to be sent out of the electronic device (e.g., to other electronic devices) via the network interface 107. Media data, which may be in the form of media files, may also be received (e.g., from other electronic devices) by the computer 100 via the network interface 107.

The memory 102 may be any type of memory such as a random access memory (RAM) and/or a read-only memory (ROM). The memory 102 may be permanent to the electronic device (such as a memory chip on a circuit board) or may be user-changeable (such as a removable memory card or memory stick). Other types of storage may be alternatively or additionally used, such as a hard disk drive, flash memory, etc. The memory 102 may store a variety of information useful to the electronic device, such as software 104 and/or data 103. The software 104 may include one or more operating systems and/or applications. The software 104 may further include a filtering component 105 and/or an automatic description generator 106, both of which will be discussed further below. The data 103 may include data about the electronic device, user files, and/or system files. For example, media files may be stored in the data 103 portion of the memory 102. Although the memory 102 is shown as being divided into separate portions in FIG. 1, this is merely shown as a functional division for explanatory purposes. The memory 102 may or may not be divided into separate portions as desired. Data, such as media files, may further be stored external to the electronic device such as on a different electronic device and/or on a network. In this case, the memory 102 may be considered to include such external storage.

Figure 2:
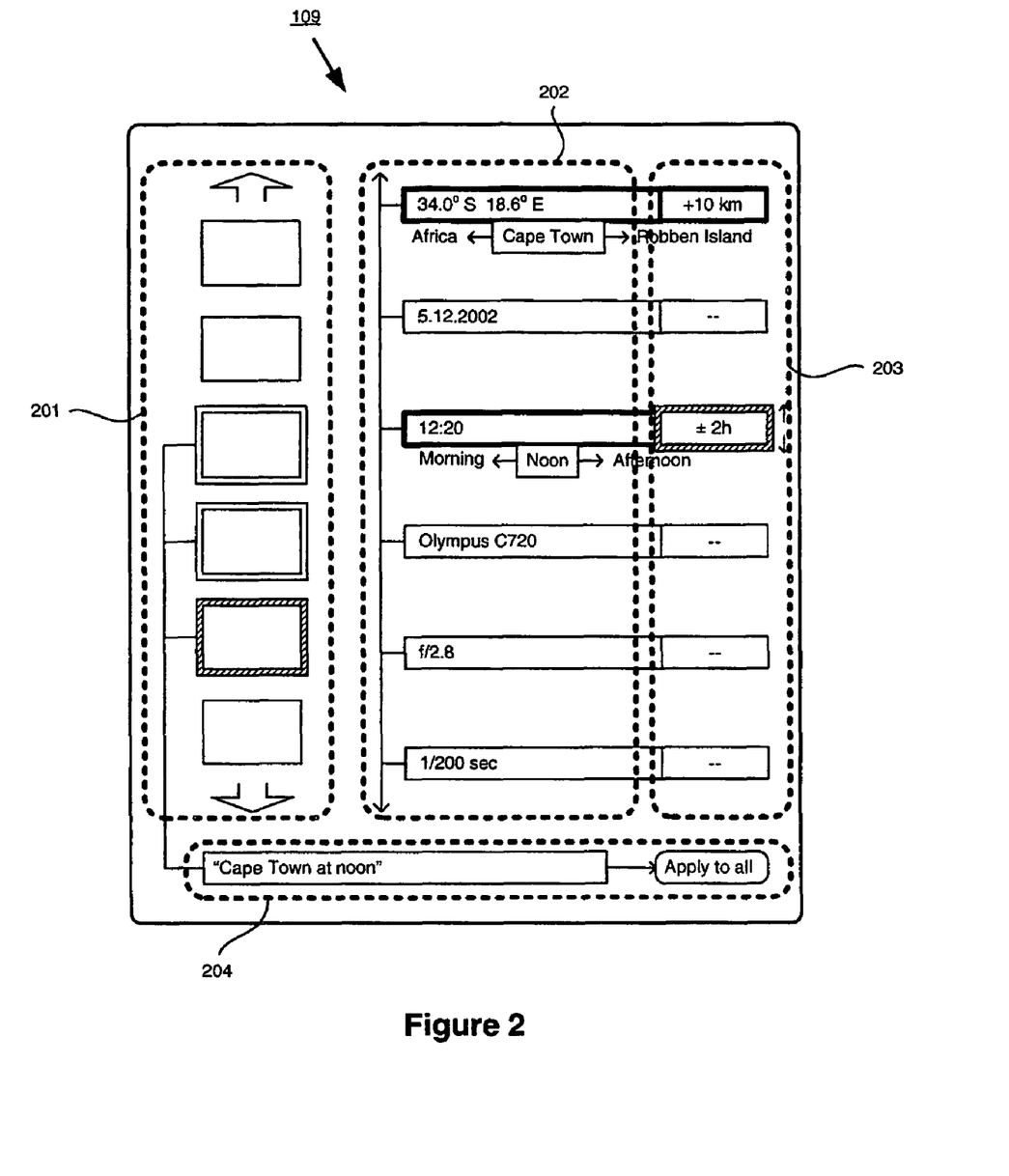
FIGS. 2 and 3 are screen shots of a display showing an illustrative user interface in accordance with at least one aspect of the present invention.

FIG. 2 shows the display 109 displaying an illustrative user interface, and provides an overview of how the user interface may be divided into functional portions. For example, the user interface may include an item browsing portion 201, a metadata visualization portion 202, a metadata modifier portion 203, and/or a description portion 204. Generally speaking, the item browsing portion 201 contains representations of one or more items, such as data files (e.g., media files). The group of items displayed or otherwise available in the item browsing portion 201 may be all stored items, or may be a subset of the stored items such as a particular folder or other grouping of items. The item representations may be in the form of icons, thumbnails of the contents of the items, textual names, and/or in any other form. The metadata visualization portion 202 contains metadata attributes that are associated with a particular one of the items in the item browsing portion 201. The metadata modifier portion 203 contains modifiers that may be used to specify search criteria, such as metadata attribute ranges, when searching for items. The description portion 204 contains a descriptive phrase of one or more of the items in the item browsing portion 201. The descriptive phrase may be automatically generated based on the metadata attributes in the metadata visualization portion 202 and/or the modifiers in the metadata modifier portion 203. The relative positions of the various portions 201-204 of the user interface are merely illustrative; one or more of the portions may be in different relative positions, may be displayed simultaneously or at different times, and/or may be combined. Additionally, the user interface may include a results portion (not shown) that includes and/or presents items that are searched by or confirmed with selected metadata and/or metadata modifiers. The item browsing portion 201 and/or the results portion may be presented in a time-line manner, e.g., items presented in the portion may be grouped based on time/day metadata and the groups of items may be scrollable along a time-line axis.

Figure 3:
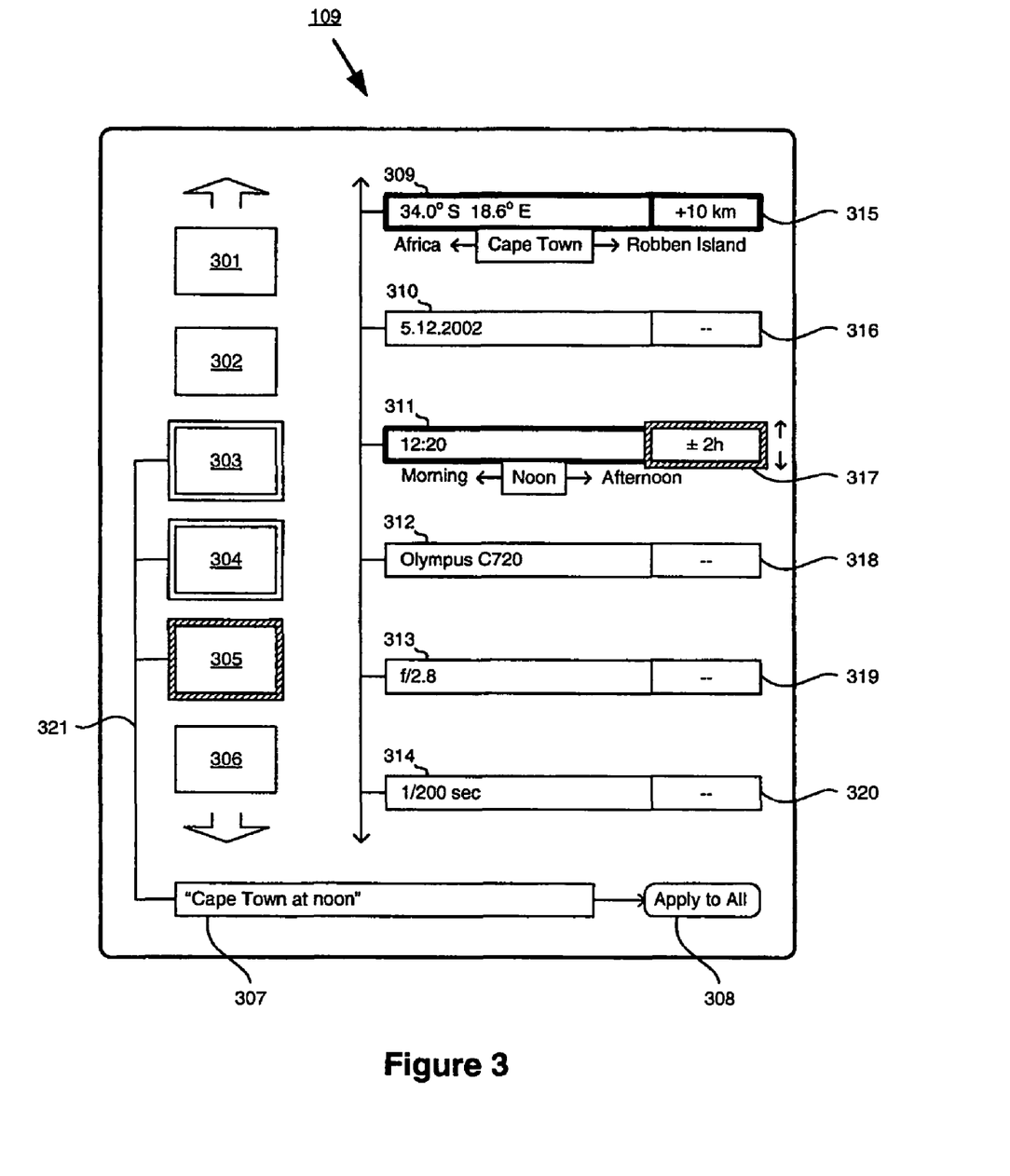

More detailed aspects of the user interface of FIG. 2 are herein explained with further reference to FIG. 3. A plurality of item representations 301-306 are shown in the item browsing portion 201, each representing a different item. As shown, the representations are displayed as a serial list that may be scrolled through by the user. However, the representations may be shown in any format. An item may be any object, such as a file (e.g., a word processing file, or a media file such as an image file, an audio file, or a video file) or an email, a personal note, or other message, such as a Short Message Service (SMS) message or a Multimedia Messaging Service (MMS) message. The user may select one or more of the representations 301-306. For example, assume that the user, Alice, has taken numerous photos during her two-week trip to Africa. Among other places, she has taken dozens of images in Cape Town, South Africa. With reference to the steps shown in FIG. 4, when browsing these images (step 401), she selects one or more items, such as images, (step 402) represented by representation 305 that happens to be a view to the sea. In step 401, the user may select one or more folders, albums, and/or set of files for display and/or browsing. Representation 305 is shown as having been selected, indicated by a thick shaded band around the perimeter of the representation 305. However, any other type of indication may be used to show that a representation has been selected. Alice may select the representation 305 via the user input interface 108, such as through the use of directional arrow keys, by pointing and tapping a stylus on a touch-sensitive display, or by issuing voice commands.

Figure 4:
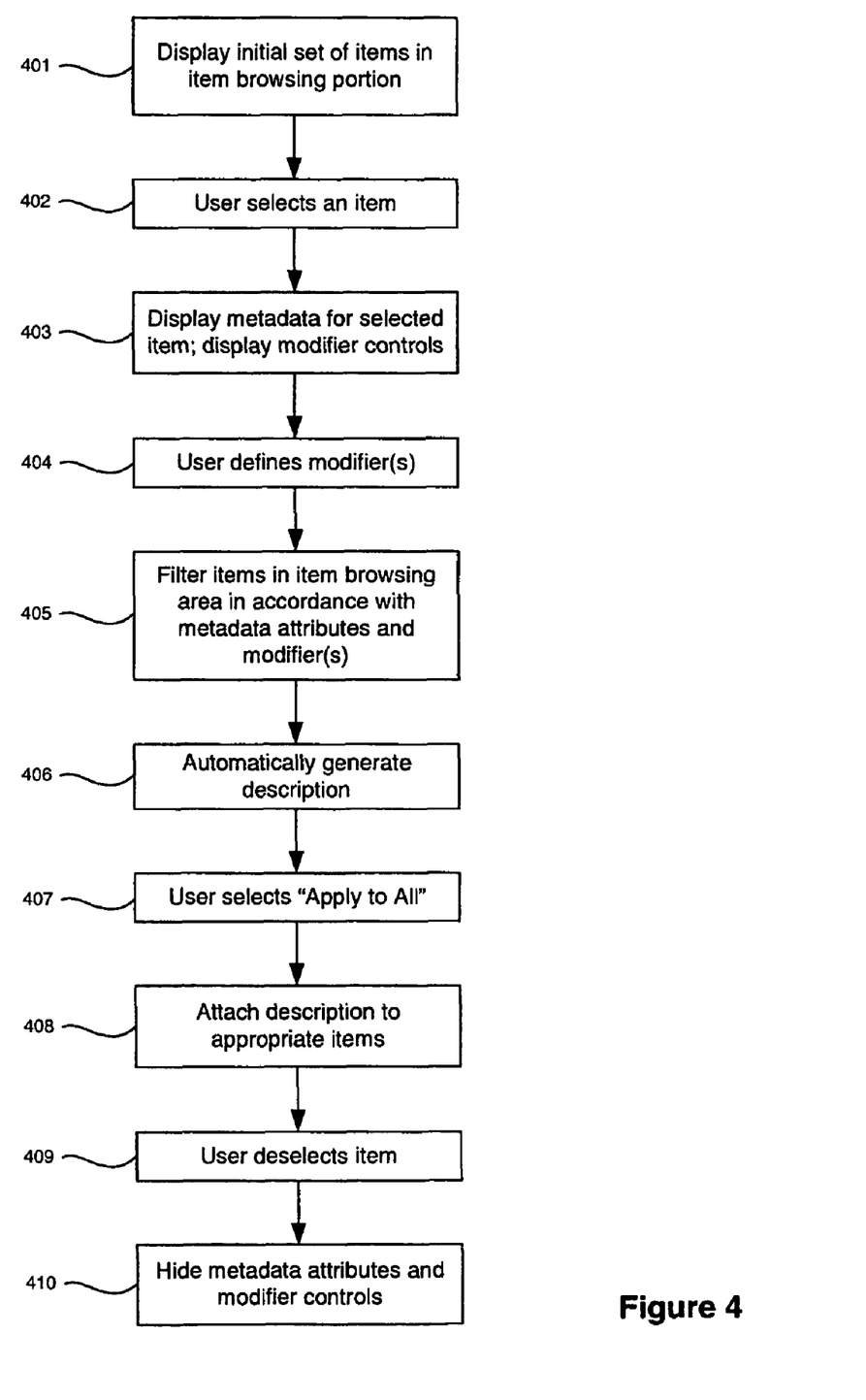
FIG. 4 is a flowchart showing illustrative steps that may be taken in accordance with at least one aspect of the present invention.

Responsive to the representation 305 being selected, the metadata visualization portion 202 may display one or more metadata attributes associated with the one or more items represented by the selected representation 305 (or multiple selected representations) (step 403). The metadata attributes may be basic attributes that are numeric or textual in nature. Each time a different representation is selected in the item browsing portion 201, its associated metadata attributes are responsively displayed in the metadata visualization portion 202. In this example, assume that the items represented by representations 301-306 are image files stored in the memory 102. That is, each item is a file containing an image. In that case, the metadata attributes may include, e.g., the location where the image was photographed, the date and/or time when the image was photographed and/or stored, the equipment used to photograph and/or process the image, and/or various photographic settings such as f-stop, zoom level, and/or exposure time (also known as shutter speed in traditional analog photography). Other metadata attributes may include, but are not limited to, the identity of a user (such as the user who stored, edited, and/or created the item), the identity of a sender and/or recipient (e.g., where the item is an email or other message), a title, audio settings (e.g., microphone settings, etc.), video settings (e.g., frames per second, etc.), whether a flash was used, a category of the item (e.g., personal, public, archived, text file, image file, audio file, video file, etc.), a location in the memory 102 where the item is stored, persons or other subject matter shown in the image or mentioned in the item, an artist or group of artists who created or who are otherwise involved in the item, and/or the source of the item (e.g., if sent from another electronic device).

As shown in this example, Alice notices that the metadata attributes for the image file represented by representation 305 include a geographic location of 34.0 degrees south latitude, 18.6 degrees east longitude (where the image was photographed), a date of Dec. 5, 2002 (the date the image was photographed), a time of 12:20 pm (the time that the image was photographed), "Olympus C720" (the camera used to photograph the image), an f-stop of f/2.8 (the f-stop used when photographing the image), and an exposure time of 1/200 second (the exposure time used when photographing the image). Each of these metadata attributes may be displayed in the metadata visualization portion 202 in a different respective attribute field 309-314. In addition to displaying the metadata attributes for a selected item, the user may also interactively define values to be placed into the attribute fields 309-314 via the user input interface 108.

Metadata attributes may be manually or automatically collected for an item. For instance, location metadata may be automatically collected by obtaining the output of a global-positioning system (GPS) unit. The GPS unit may be coupled to the computer 100 via the media input interface 110 or some other interface. Where the electronic device is a camera-phone, it may be preferred that the GPS unit generally be in the same location as the camera. Other metadata attributes that may be automatically collected include, but are not limited to, date and time (e.g., collected from a clock coupled to the computer 100), direction (e.g., collected from a compass coupled to the computer 100), the type of the electronic device, the identity of the user, camera settings, audio settings, and video settings. When Alice took the photo of the sea in Cape Town, some or all of the metadata attributes shown in the metadata visualization portion 202 may have been automatically collected and attached to the image file represented by representation 305.

The metadata modifier portion 203 of the user interface is shown having a plurality of modifier fields 315-320, each associated with a different one of the attribute fields 309-314. In other words, each of the attribute fields 309-314 may have an associated modifier field 315-320. The modifier fields 315-320 each may interactively receive user input, via the user input interface 108, to define a modifier. A modifier may define a single value (e.g., 5), a plurality of values (e.g., 1, 5, and 6), or a range of values (e.g., +/−5, or "within 5", or "−2 to 5"). The modifier defines limits as to how the associated metadata attribute may be modified, or may vary, and helps to define search criteria for searching for items. For example, Alice may select the location modifier field 315 on the screen and choose "Range: 10 km" (step 404). In this case, this signifies a circle of radius 10 km around the location identified by the metadata attribute 34.0 degrees south latitude, 18.6 degrees east longitude. Alice may further choose the time and date, and inputs "Timeframe: +/−2 hours," signifying a timeframe of two hours before and two hours after 12:20 (i.e., 10:20 to 14:20). Alternatively, the modifier field may define a single or multiple or a range of text strings. For example, if an attribute field describes an attribute such as a topic, creator, capturing device (312), location (309), etc., the modifier field may include one or more text strings such as "Topic: Cape Town, Cape Town City, With Robinson's", "Creator: Mary Anderson", "Capturing device: Nokia 6260, Nokia 6630".

Responsive to Alice defining the modifier field 315, the item browsing portion 201 of the user interface may selectively filter the items (step 405) so as to indicate which of the items are within the criteria shown in the location attribute field 309 and the modifier field 315. Items that are within the defined criteria will be referred to as conforming items. Items that are not within the defined criteria will be referred to as non-conforming items. In the example shown in FIG. 3, the conforming items are the items represented by representations 303, 304, and 305. Upon Alice further defining the modifier field 317, the item browsing portion 201 may further selectively filter the remaining items (step 405) so as to indicate which of these items are also within the criteria shown in the time attribute field 311 and the modifier field 317. Filtering is performed by the filtering component 105. Items in the item browsing portion 201 may be filtered by actually removing the representations of non-conforming items from being displayed. Alternatively, non-conforming items may be distinguished from conforming items by displaying their representations in a different way. For example, as shown in FIG. 3, conforming items may have a thicker border than non-conforming items. Another way to filter the items is to reorder them, such as by grouping the conforming items together and listing them first. Lines 321 connecting the conforming items, or other indicators, may also be displayed to clearly show that the conforming items are considered to be a group. Alternatively, confirmed items may presented in a separate results portion. Thus, by using metadata attributes and modifiers, a user may easily narrow down a large set of items to a subset of the items that are likely to be of interest to the user. The subset of items may be chosen irrespective of how the items may already or subsequently be grouped into folders, albums, or other types of collections. Also, the folders, albums, etc. may also be considered to be selectable items themselves.

Once a subset of the items (or a single item) has been determined, it may be desirable to name or describe that group in a way that is likely to be meaningful to the user. In the present user interface, descriptive phrases (e.g., textual descriptions) of an item or a group of items may be automatically generated and displayed in the description portion 204 of the user interface (step 406). The descriptive phrases may be generated based on the metadata attributes of that item and/or the metadata modifiers shown in portions 202 and/or 203. The individual metadata attributes might not be particularly meaningful or useful to the user. However, a more user-friendly description may be generated that allows the user to better understand, and therefore better organize and find, the item. For example, using the geographic location and the time attributes selected by the user, Alice, a more user-friendly descriptive phrase such as "Cape Town at noon" may be generated for the conforming items. The first part of the descriptive phrase, "Cape Town," may be derived from the coordinates shown in the location attribute field 302 and/or from the range modifier shown in the modifier field 315. If the range modifier had been larger than 10 km, for example 80 km, then this portion of the descriptive phrase may have been altered to take this larger range into account, such as by naming the larger region surrounding Cape Town: the Cape Peninsula. The second part of the descriptive phrase, "at noon," may be derived from the time shown in the time attribute field 311 and/or the time modifier field 317. Since the modifier provides a range of times between 10:20 and 14:20, the second part of the descriptive phrase may alternatively have been, e.g., "around noon." Had the modifier been larger, say +/−6 hours, then the second part of the descriptive phrase may instead have been "during the daytime" or the like, to take into account the larger modifier. Had Alice also selected the date attribute field 310, then the descriptive phrase may have taken the form of, e.g., "Cape Town on May 12, 2002, at noon." If the date modifier field 316 had contained a range of, e.g., +3 weeks, or "the entire month," then the descriptive phrase may have taken the form of, e.g., "Cape Town in May at noon." The descriptive phrase may be manually edited by the user.

More complex combinations (Boolean or otherwise) of metadata attributes may further be used in the generation of the descriptive phrase. For example, Alice may choose metadata attributes A, B, C, and D, in the following Boolean combination: A and B and C and (D or E), where A is the item type "image," B is the location name Cape Town, C is the time of day, noon, D is the user name John, and E is the user name Mary. One possible descriptive phrase from this combination of metadata attributes may be "Images of Cape Town at noon taken by John or Mary."

In short, the descriptive phrase may depend upon the content of one or more metadata attributes and one or more modifiers. Alternatively, the modifiers might not be used to generate the descriptive phrase, and instead only the metadata attributes in one or more of the fields 309-314 may be used.

The automatic description generator 106 may be responsible for automatically generating the descriptive phrases. The automatic description generator 106 is a software component that converts raw metadata to higher-level, user-readable metadata, and combines the collected single metadata attributes into one sentence or other phrase. For some types of metadata attributes, such as time, simple rules may be sufficient for conversion of metadata attributes into more useful descriptions, such as the names of day portions. For dates, simple rules may be used to convert to the names of days of the week, the names of months, the identification of weeks, the names of seasons, the names of holidays (e.g., Easter, Christmas, Thanksgiving, Midsummer, Rosh Hashanah, etc.), and/or the identification of years. Simple lists or look-up tables may be sufficient. The user may even be able to define entries in such look-up tables or lists. For instance, the user may define and correlate a particular geographic coordinate location with the place name, "home." For other types of metadata attributes, additional processing may be required. For example, converting cellular location information and/or GPS coordinates into location names may be done using a look-up table or list, for example, and the names for locations may be deduced from one or more sources, such as network-based location name servers or map servers. The automatic description generator 106 may contain one or more sub-components, such as a location component that converts raw coordinates into location names (such as city, state, country, or landmark names), and/or a time component that converts times of day into day portion names (such as "morning," "noon," "afternoon," "evening," or "night"), as well as dates into months or times of year, etc. (such as "spring," "summer," "fall," or "winter"). The user may choose the level of detail (e.g., city versus country) that he or she wishes to use.

The descriptive phrase may be displayed in a description field 307, and Alice may accept this automatically generated descriptive phrase, or she may manually edit the description field 307. Once Alice is satisfied with the descriptive phrase, she may select an "Apply to All" button 308, causing the descriptive phrase in the description field 307 to be attached to each of the conforming items (steps 407 and 408). Alternatively, the description field 307 may be attached to all items originally selected from and/or presented in the item browsing portion 201, or only to the one selected item, such as representation 305. Once the descriptive phrase has been attached to the conforming items, Alice may decide to select other items, or to deselect the selected item. If Alice deselects the selected item (step 409), then the metadata attributes for that previously-selected item may no longer be displayed in the metadata visualization portion 202, and the modifier portion 203 may also be removed from being displayed (step 410). The system is now ready for Alice to perform another action as desired. For example, the system is now ready for Alice to select another one or more items, such as files, folders, and/or albums, in the item browsing portion 201.

Thus, illustrative methods, apparatuses, and user interfaces have been described that assist a user with the manipulation, organization, and searching of numerous stored items in a computing device. While exemplary systems and methods as described herein embodying various aspects of the present invention are shown by way of example, it will be understood, of course, that the invention is not limited to these embodiments. Modifications may be made by those skilled in the art, particularly in light of the foregoing teachings. For example, each of the elements of the aforementioned embodiments may be utilized alone or in combination with elements of the other embodiments. In addition, the invention has been defined using the appended claims, however these claims are exemplary in that the invention is intended to include the elements and steps described herein in any combination or sub combination. It will also be appreciated and understood that modifications may be made without departing from the true spirit and scope of the invention. For example, while some components are described as software components or hardware components, these designations are merely illustrative; hardware, firmware, and/or software may be used to implement certain components as desired. Also, although examples have been provided in the context of photographic images, other types of items, and other types of media files, may be used in connection with the present invention.

What is claimed is:

1. A method, comprising:
   selecting an item from a plurality of items each having associated metadata attributes;
   displaying a first value of a first metadata attribute of the selected item;
   defining a first modifier that modifies the first value of the first metadata attribute;
   searching the plurality of items in accordance with the first value and the first modifier; and
   displaying a result of the searching.

2. The method of claim 1, further including a step of receiving first user input defining the first modifier.

3. The method of claim 1, further including displaying the first modifier in a first user-modifiable input field.

4. The method of claim 1, wherein the first modifier defines a single value.

5. The method of claim 1, wherein the first modifier defines a plurality of values.

6. The method of claim 1, wherein the first modifier defines a range of values and the first metadata attribute defines only a single value.

7. The method of claim 1, wherein the first value includes text.

8. The method of claim 1, further including steps of:
   displaying a second value of a second metadata attribute of the selected item;
   defining a second modifier that modifies the second value of the second metadata attribute;
   wherein the step of searching includes searching the plurality of items in accordance with the first value, the second value, the first modifier, and the second modifier.

9. The method of claim 8, wherein the step of displaying the second value includes displaying the second value simultaneously with the first value, the method further including a step of displaying the second modifier simultaneously with the first modifier, the first value, and the second value.

10. The method of claim 8, further including a step of receiving second user input defining the second modifier.

11. The method of claim 8, further including a step of displaying the second modifier in a second user-modifiable input field.

12. The method of claim 1, wherein the plurality of items are media files.

13. The method of claim 1, wherein the first metadata attribute is at least one of location, time, date, or user identification.

14. The method of claim 1, wherein the first metadata attribute is a description of content of the selected item.

15. The method of claim 1, wherein the step of displaying the first value includes displaying the first value of the first metadata attribute in addition to a title of the selected item.

16. A computer-readable medium storing computer-executable instructions for performing steps, the steps comprising:
    displaying a user interface, comprising:
        a first portion for indicating a value of a metadata attribute of a first item;
        a second portion for indicating a modifier associated with the metadata attribute, the first modifier modifying the value of the metadata attribute; and
        a third portion for indicating representations of at least some of a plurality of items, including the first item, each of the plurality of items having associated metadata attributes.

17. The computer-readable medium of claim 16, wherein the third portion is configured to allow a user to select the first item from the third portion, the first portion indicating the value of the metadata attribute of the first item responsive to receiving a user selection of the first item.

18. The computer-readable medium of claim 16, wherein the third portion indicates which of the plurality of items correspond to the value of the modifier indicated in the second portion.

19. The computer-readable medium of claim 18, wherein the third portion further indicates which of the plurality of items is the first item.

20. The computer-readable medium of claim 16, wherein the second portion is configured to allow a user to define the modifier.

21. The computer-readable medium of claim 16, wherein the representations are thumbnails of the items.

22. The computer-readable medium of claim 16, wherein the user interface further includes a fourth portion for indicating a descriptive phrase associated with the first item.

23. An apparatus, comprising:
    an input interface configured to allow a user to select an item from a plurality of items each having associated metadata attributes;
    a display; and
    a controller coupled to the display and the input interface and configured to cause the display to display a first value of a first metadata attribute of the selected item, and to further present on the display a first modifier that modifies the first value of the first metadata attribute,
    the controller further configured to search the plurality of items in accordance with the first value and the first modifier.

24. A method in a computer for searching stored items and for automatically generating a file description, comprising steps of:
    selecting an item from a plurality of items each having associated metadata attributes;
    displaying a plurality of metadata attributes of the selected item, including a first metadata attribute;
    displaying a first value of the first metadata attribute;
    displaying a first modifier that modifies the first value of the first metadata attribute;
    searching the plurality of items in accordance with the first value and the first modifier, to find a searched item;
    generating a descriptive phrase from the first metadata attribute and the first modifier; and
    attaching the descriptive phrase to the searched item.

25. A computer-readable medium storing computer-executable instructions for performing steps, the steps comprising:
    displaying a user interface, comprising:
        a first portion for receiving a user selection of an item from a plurality of items each having associated metadata attributes;
        a second portion for indicating a plurality of metadata attributes of the selected item, including a first metadata attribute, for indicating a first value of the first metadata attribute and for indicating a first modifier that modifies the first value of the first metadata attribute; and
        a third portion for indicating a descriptive phrase from the first metadata attribute and the first modifier.

26. The computer-readable medium of claim 25, wherein the user interface further indicates results of a search of the plurality of items in accordance with the first value and the first modifier.

27. The computer-readable medium of claim 25, wherein the first portion and the third portion are the same portion.

28. An apparatus, comprising:
    a display;
    an input interface configured to receive a user selection of an item from a plurality of items displayed on the display and each having associated metadata attributes; and
    a controller coupled to the display and the input interface and configured to cause the display to display the plurality of items and a plurality of metadata attributes of the selected item, including a first metadata attribute, to display a first value of the first metadata attribute, and to display a first modifier that modifies the first value of the first metadata attribute,
    the controller further configured to search the plurality of items in accordance with the first value and the first modifier, and responsive to the input interface receiving a user selection of the first metadata attribute from the plurality of metadata attributes, to generate a descriptive phrase from the first metadata attribute and the first modifier and attach the descriptive phrase to the selected item.

29. The method of claim 1, further including displaying a value of the first modifier separately from, and simultaneously with, the first value.

30. The method of claim 24, wherein the first modifier defines a range of values and the first metadata attribute defines only a single value.

31. The method of claim 24, wherein the first modifier defines a plurality of values.

* * * * *